Figure 1:
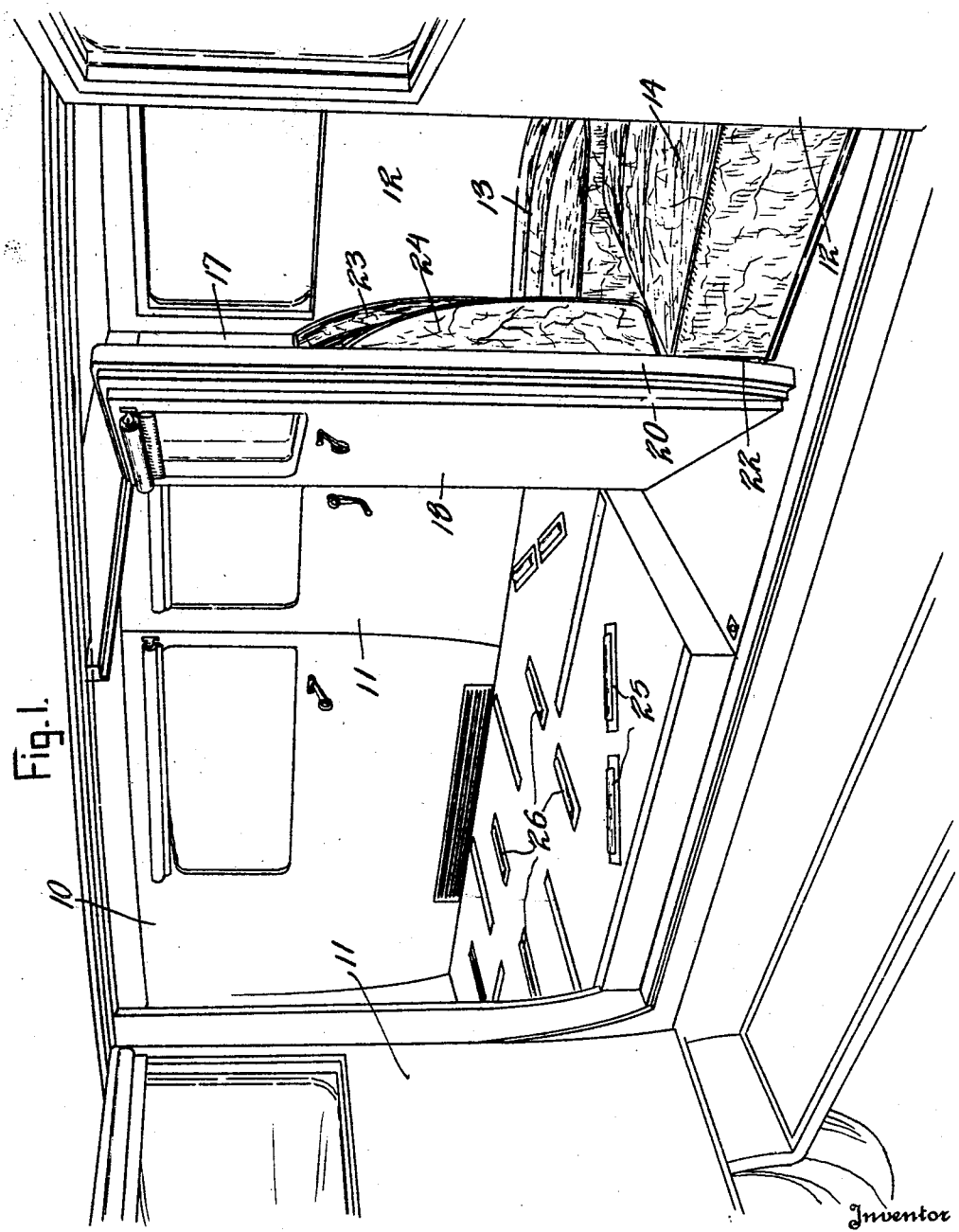

Nov. 3, 1931.  R. L. SILVER  1,830,376
FUNERAL CAR
Filed Nov. 29, 1929  2 Sheets-Sheet 1

Inventor
Ralph L. Silver

By
Attorney

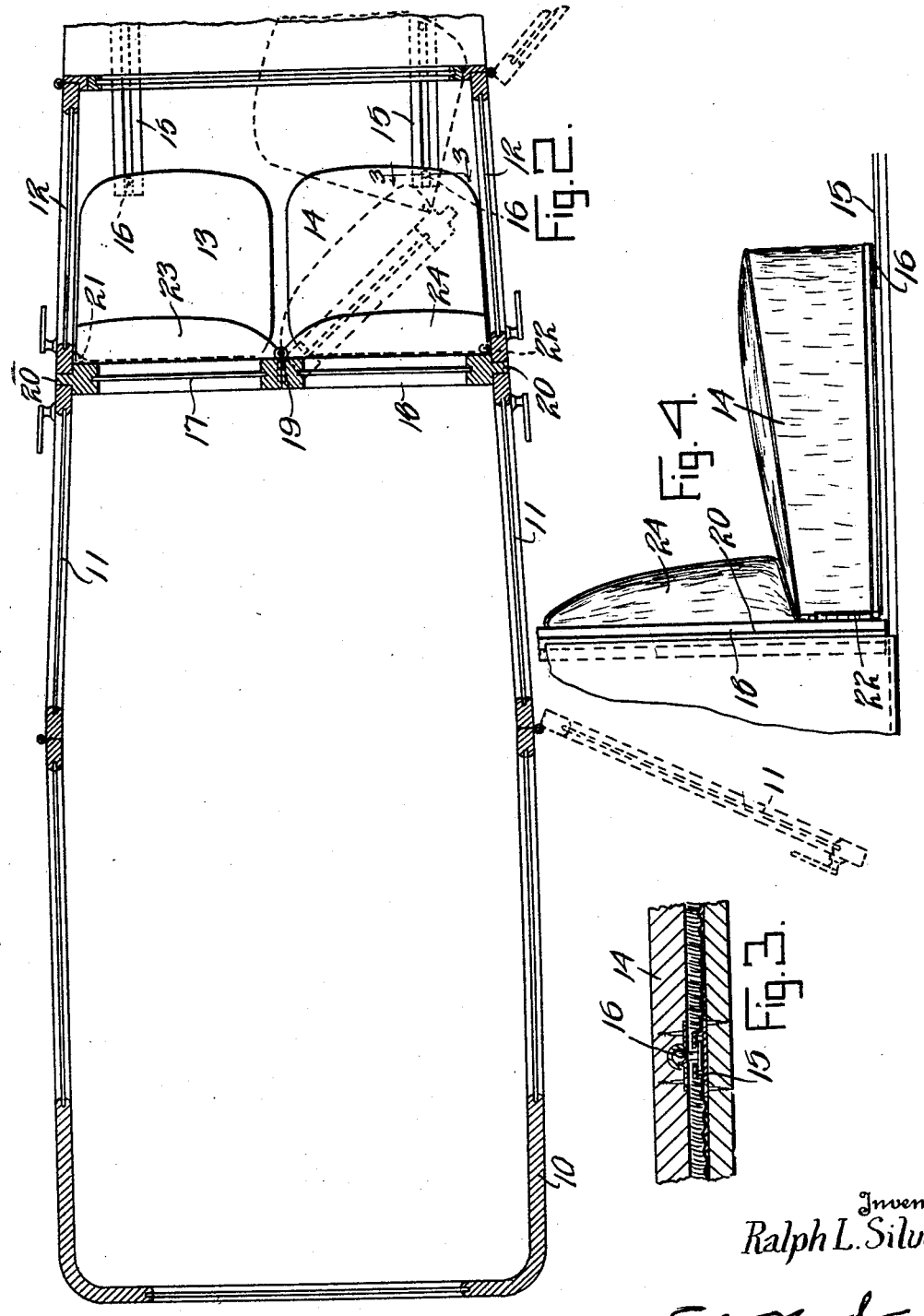

Patented Nov. 3, 1931

1,830,376

UNITED STATES PATENT OFFICE

RALPH L. SILVER, OF KNIGHTSTOWN, INDIANA, ASSIGNOR TO KNIGHTSTOWN BODY COMPANY, OF KNIGHTSTOWN, INDIANA, A CORPORATION OF INDIANA

FUNERAL CAR

Application filed November 29, 1929. Serial No. 410,573.

My invention relates to side loading funeral cars or hearses such as illustrated in a general way in my Patent No. 1,680,811, of August 14, 1929, the present invention relating particularly to such a vehicle wherein the main body of the car is separated from the driver's compartment by a partition and consists in a construction and arrangement of parts whereby by moving forward a part of said partition the seat will be moved forward to a position out of the way of the casket in loading or unloading, all as will be hereinafter more fully described and claimed.

Referring to the accompanying drawings which are made a part hereof and on which similar reference characters indicate similar parts, Figure 1 is a perspective view illustrating a car embodying my invention, the parts being illustrated with the side open as when a casket is to be loaded, Figure 2, a horizontal section, Figure 3, a section on line 3—3 of Figure 2, and Figure 4, a side elevation of one seat.

In the drawings reference character 10 indicates a body adapted to a funeral car of this type provided with a pair of doors 11 and 12 which are hinged to the body 10 in such a way as to permit them to swing outwardly. The doors 11 and 12 when open as shown by the dotted lines in Figure 2 provide an opening equal to the combined width of the two doors. Seats 13 and 14 are provided for the driver and attendant each mounted to slide back and forth and guided by slotted tracks 15 in the slots of which is a pin or stud 16 on the underside to which the respective seat frames are pivotally engaged. The compartment designed for the driver and attendant is separated from the main body of the car by a partition comprising sections 17 and 18 hinged together at the center by hinges 19. The outer members 20 of the frame of said partition are recessed to form door jambs against which the car doors close and thus normally hold the partition in fixed position. The said frames are each hinged at their respective outer edges to the partition sections 17 and 18 by hinges 21 and 22. The backs 23 and 24 of the seats are carried on the partition sections and the cushions of the seats are mounted on said seat frames.

As in my above named patent rollers 25 are arranged in the car in front of the opening disposed at an angle to the longitudinal axis of the vehicle and further assist in loading or unloading. A number of additional rollers 26 are disposed transversely of the body which receive the casket from the annular rollers and tend to bring it to longitudinal position in the car.

The operation is as follows, it being desired to load a casket into the car from the side indicated in Figure 1, doors 11 and 12 are opened, when section 18 of the partition may be swung forward on its hinge 19 which motion because of the hinged connection 22 also slides forward the seat at this side of the car removing all obstruction to the opening and thus permitting ready loading and unloading. The operation is the same, as will be understood, when the loading or unloading is to be from the other side of the car.

By this arrangement the compartment designed for the driver and attendant is entirely separated from the main body of the car and with the obvious advantages.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A vehicle body of the class described comprising a sectional movable partition, a seat comprising a back fixed to the front side of a section of the partition, a seat portion pivoted at one corner to the free end of a section of said partition, a track secured to the floor of the vehicle, and a stud pivotally secured to the bottom of the said seat portion slidably engaged in said track for guiding the seat forward, substantially as set forth.

2. In a vehicle body of the class described, a movable hinged partition, a driver's compartment having a plurality of seats, said seats conforming to the interior of the sides of the compartment and each connected to a section of the movable hinged partition, said partition serving as a support for the back and as a movable axis for the seat portion, and means for guiding the seats in a substantial forward direction to permit an unobstructed entrance to the vehicle body, substantially as set forth.

3. A funeral car comprising a body, doors secured to the side of the body adapted to swing outwardly to provide an unobstructed side opening, a movable sectional partition dividing the vehicle body into compartments, a seat comprising a back fixed to the front side of a section of the partition, a seat portion connected at its outer corner to said partition adapted to swing its free rear corner from the partition and pivoted means mounted on the underside of said seat portion adapted to guide the seat in a substantially forward direction as the partition is moved forward, substantially as set forth.

In witness whereof, I have hereunto set my hand at Knightstown, Indiana, this 29th day of October, A. D. nineteen hundred and twenty-nine.

RALPH L. SILVER.